US009563233B2

(12) United States Patent
McCormack et al.

(10) Patent No.: US 9,563,233 B2
(45) Date of Patent: Feb. 7, 2017

(54) ELECTRONIC DEVICE WITH PLATED ELECTRICAL CONTACT

(71) Applicant: MICROSOFT TECHNOLOGY LICENSING, LLC, Redmond, WA (US)

(72) Inventors: Mark Thomas McCormack, Livermore, CA (US); Anthony Allen Fischer, Redmond, WA (US); Raj Master, San Jose, CA (US); Farah Shariff, Kirkland, WA (US); Dennis Tom, Redmond, WA (US); Zulfiqar Alam, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/460,286

(22) Filed: Aug. 14, 2014

(65) Prior Publication Data

US 2016/0048159 A1 Feb. 18, 2016

(51) Int. Cl.
*H01R 9/00* (2006.01)
*H02B 1/04* (2006.01)
(Continued)

(52) U.S. Cl.
CPC .............. *G06F 1/163* (2013.01); *C25D 3/50* (2013.01); *C25D 3/62* (2013.01); *C25D 5/10* (2013.01);
(Continued)

(58) Field of Classification Search
CPC ....... H01H 63/06; B60R 16/0238; G08B 7/06; A61B 5/681; A61B 5/0205; A61B 2560/0242
(Continued)

(56) References Cited

U.S. PATENT DOCUMENTS 3,484,209 A 12/1969 Antler
4,322,833 A * 3/1982 Husted .................. G04G 21/08
307/116
(Continued)

FOREIGN PATENT DOCUMENTS

EP 0410472 A2 1/1991
EP 0531099 A2 3/1993
(Continued)

OTHER PUBLICATIONS

Fingas, Jon, "TomTom's new GPS watches track your heart rate without a chest strap (update: US pricing)", http://www.engadget.com/2014/04/03/tomtom-cardio-gps-watches/, Apr. 3, 2014, 10 pages.
(Continued)

*Primary Examiner* — Hung S Bui
(74) *Attorney, Agent, or Firm* — Brandon Roper; Judy Yee; Micky Minhas (57) ABSTRACT

An electronic device includes an electronic component configured to receive electric current and a plated contact electrically coupled to the electronic component and configured to carry the electric current to the electronic component from a system external to the device. The plated contact includes a copper-alloy layer, a platinum-group metal (PGM) layer plated over the copper-alloy layer, and a gold-alloy layer plated over the PGM layer.

19 Claims, 9 Drawing Sheets

(51) Int. Cl.
*G06F 1/16* (2006.01)
*C25D 7/00* (2006.01)
*C25D 3/50* (2006.01)
*C25D 3/62* (2006.01)
*C25D 5/10* (2006.01)
*H01R 13/03* (2006.01)

(52) U.S. Cl.
CPC ............... *C25D 7/00* (2013.01); *G06F 1/1684* (2013.01); *H01R 13/03* (2013.01)

(58) Field of Classification Search
USPC .......................................................... 361/822
See application file for complete search history.

(56) References Cited

U.S. PATENT DOCUMENTS

| | | | | |
|---|---|---|---|---|
| 5,316,205 | A * | 5/1994 | Melton | H05K 3/3426 174/259 |
| 5,668,410 | A * | 9/1997 | Yamamoto | H01L 24/11 257/737 |
| 5,770,821 | A * | 6/1998 | Hikasa | H01L 23/3677 174/264 |
| 6,177,046 | B1 | 1/2001 | Simkovich et al. | |
| 2002/0160222 | A1 | 10/2002 | Man et al. | |
| 2003/0189249 | A1 * | 10/2003 | Tong | H01L 23/49503 257/737 |
| 2005/0003227 | A1 | 1/2005 | Khan et al. | |
| 2006/0210825 | A1 | 9/2006 | Gleeson et al. | |
| 2007/0279852 | A1 * | 12/2007 | Daniel | A44C 5/0007 361/679.03 |
| 2009/0202862 | A1 | 8/2009 | Chen et al. | |
| 2011/0098583 | A1 | 4/2011 | Pandia et al. | |
| 2012/0315717 | A1 * | 12/2012 | Park | H01L 27/124 438/34 |
| 2015/0349457 | A1 * | 12/2015 | Shariff | H01R 24/20 439/37 |

FOREIGN PATENT DOCUMENTS

| | | |
|---|---|---|
| JP | H04202696 A | 7/1992 |
| JP | 2010044983 A | 2/2010 |

OTHER PUBLICATIONS

Goode, Lauren, "Samsung's New Gear Fit Needs to Work on the "Fit" Part", http://recode.net/2014/04/08/samsungs-new-gear-fit-needs-to-work-on-the-fit-part/, Apr. 8, 2014, 10 pages.

"Samsung Gear Fit, Gear 2 and Gear 2 Neo go on sale worldwide", NDTV Gadgets, http://gadgets.ndtv.com/others/news/samsung-gear-fit-gear-2-and-gear-2-neo-go-on-sale-worldwide-507220, Apr. 11, 2014, 3 pages.

Poeter, Damon, "Meet Simband, Samsung's Next-Gen Health Tracker", http://www.pcmag.com/article2/0,2817,2458663,00.asp, May 28, 2014, 5 pages.

Sato, et al., "Palladium with a Thin Gold Layer as a Sliding Contact Material", In Proceedings of IEEE Transactions on Components, Hybrids, and Manufacturing Technology, vol. 4, Issue 1, Mar. 1981, 5 pages.

"Surface Treatment of Metals and Plastic Materials using Electrolytic or Chemical Process", Published on: Jun. 2001, Available at: http://www.surfinetek.com/AZD/pollutionprevention.pdf.

ISA European Patent Office, International Search Report and Written Opinion Issued in Application No. PCT/US2015/044547, Oct. 27, 2015, WIPO, 10 Pages.

IPEA European Patent Office, International Preliminary Report on Patentability issued in PCT Application No. PCT/US2015/044547, Jul. 15, 2016, WIPO, 6 pages.

* cited by examiner

ELECTRONIC DEVICE WITH PLATED ELECTRICAL CONTACT

BACKGROUND

Electronic devices often include electrical contacts for recharging and sending and receiving data. When such contacts are exposed to corrosive substances, the contacts can degrade.

DETAILED DESCRIPTION

This disclosure relates to an electronic device that may optionally be worn next to human skin. The electronic device includes an electronic component configured to receive electric current. Coupled to the electronic component is a plated contact. The plated contact is configured to carry the electric current to the electronic component from a system external to the device. The plated contacts include layer of a platinum-group metal (PGM), which is plated over a copper-alloy base. A gold-alloy layer is then plated over the PGM layer to provide desirable conductivity and corrosion resistance.

Figure 1A:
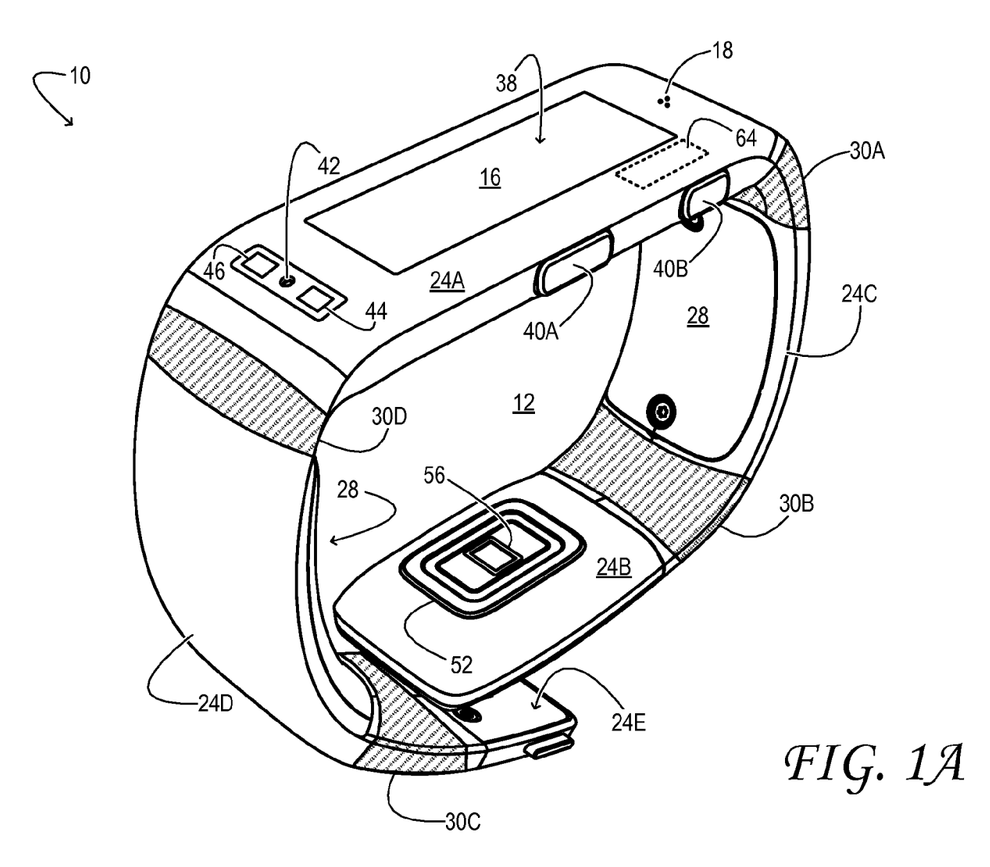
FIG. 1A shows aspects of an example wearable electronic device.
Figure 1B:
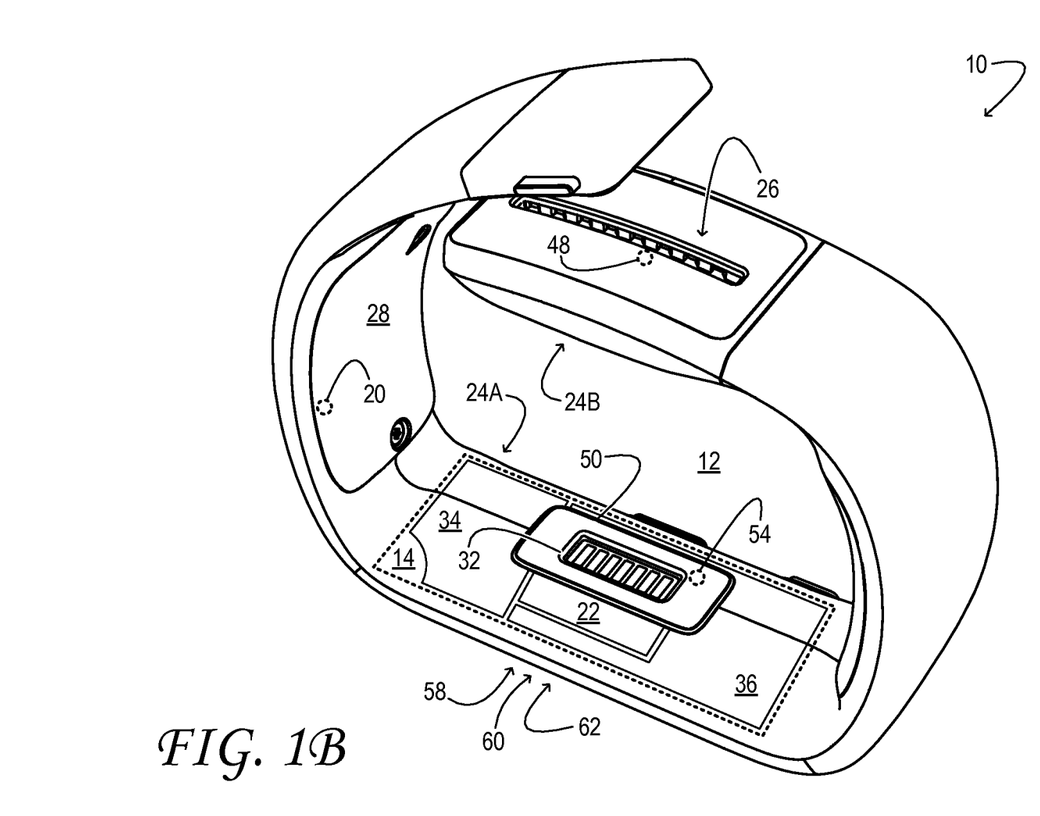
FIG. 1B shows additional aspects of the example wearable electronic device.

FIGS. 1A and 1B show aspects of an example wearable electronic device 10 that includes such plated contacts. The illustrated device takes the form of a composite band 12. In one implementation, a closure mechanism enables facile attachment and separation of the ends of the composite band, so that the band can be closed into a loop and worn on the wrist. In other implementations, the device may be fabricated as a continuous loop resilient enough to be pulled over the hand and still conform to the wrist. Alternatively, the device may have an open-bracelet form factor in which ends of the band are not fastened to one another. In still other implementations, wearable electronic devices of a more elongate band shape may be worn around the user's bicep, waist, chest, ankle, leg, head, or other body part. Accordingly, the wearable electronic devices here contemplated include eye glasses, a head band, an arm-band, an ankle band, a chest strap, or any other wearable form factor. Furthermore, electronic devices without wearable configurations may include plated contacts.

As shown in the drawings, wearable electronic device 10 may include various functional electronic components: a compute system 14, display 16, loudspeaker 18, haptic motor 20, communication suite 22, and various sensors. In the illustrated implementation, the functional electronic components are integrated into the several rigid segments of the band—viz., display-carrier module 24A, pillow 24B, energy-storage compartments 24C and 24D, and buckle 24E. This tactic protects the functional components from physical stress, from excess heat and humidity, and from exposure to water and substances found on the skin, such as sweat, lotions, salves, and the like. In the illustrated conformation of wearable electronic device 10, one end of composite band 12 overlaps the other end. Buckle 24E is arranged at the overlapping end of the composite band, and receiving slot 26 is arranged at the overlapped end.

The functional electronic components of wearable electronic device 10 draw power from one or more energy-storage electronic components 28. A battery—e.g., a lithium ion battery—is one type of energy-storage electronic component. Alternative examples include super- and ultra-capacitors. To provide adequate storage capacity with minimal rigid bulk, a plurality of discrete, separated energy-storage electronic components may be used. These may be arranged in energy-storage compartments 24C and 24D, or in any of the rigid segments of composite band 12. Electrical connections between the energy-storage electronic components and the functional electronic components are routed through flexible segments 30. In some implementations, the energy storage cells have a curved shape to fit comfortably around the wearer's wrist, or other body part.

In general, energy-storage electronic components 28 may be replaceable and/or rechargeable. In some examples, recharge power may be provided through a universal serial bus (USB) port 32, which includes the plated contacts and a magnetic latch to releasably secure a complementary USB connector. In other examples, the energy-storage electronic components may be recharged by wireless inductive or ambient-light charging. In still other examples, the wearable electronic device may include electro-mechanical componentry to recharge the energy-storage electronic components from the user's adventitious or purposeful body motion.

In wearable electronic device 10, compute system 14 is housed in display-carrier module 24A and situated below display 16. The compute system is operatively coupled to display 16, loudspeaker 18, communication suite 22, and to the various sensors. The compute system includes a data-storage machine 34 to hold data and instructions, and a logic machine 36 to execute the instructions.

Display 16 may be any suitable type of display, such as a thin, low-power light emitting diode (LED) array or a liquid-crystal display (LCD) array. Quantum-dot display technology may also be used. Suitable LED arrays include organic LED (OLED) or active matrix OLED arrays, among others. An LCD array may be actively backlit. However, some types of LCD arrays—e.g., a liquid crystal on silicon, LCOS array—may be front-lit via ambient light. Although the drawings show a substantially flat display surface, this aspect is by no means necessary, for curved display surfaces may also be used. In some use scenarios, wearable electronic device 10 may be worn with display 16 on the front of the wearer's wrist, like a conventional wristwatch.

Communication suite 22 may include any appropriate wired or wireless communications componentry. In FIGS. 1A and 1B, the communications suite includes the USB port 32 with the plated contacts, which may be used for exchanging data between wearable electronic device 10 and other computer systems, as well as providing recharge power. The communication suite may further include two-way Bluetooth, Wi-Fi, cellular, near-field communication, and/or other radios. In some implementations, the communication suite may include an additional transceiver for optical, line-of-sight (e.g., infrared) communication.

In wearable electronic device 10, touch-screen sensor 38 is coupled to display 16 and configured to receive touch input from the user. Accordingly, the display may be a touch-sensor display in some implementations. In general, the touch sensor may be resistive, capacitive, or optically based. Push-button sensors (e.g., microswitches) may be used to detect the state of push buttons 40A and 40B, which may include rockers. Input from the push-button sensors may be used to enact a home-key or on-off feature, control audio volume, microphone, etc.

FIGS. 1A and 1B show various other sensors of wearable electronic device 10. Such sensors include microphone 42, visible-light sensor 44, ultraviolet sensor 46, and ambient-temperature sensor 48. The microphone provides input to compute system 14 that may be used to measure the ambient sound level or receive voice commands from the user. Input from the visible-light sensor, ultraviolet sensor, and ambient-temperature sensor may be used to assess aspects of the user's environment.

FIGS. 1A and 1B show a pair of contact sensors— charging contact sensor 50 arranged on display-carrier module 24A, and pillow contact sensor 52 arranged on pillow 24B. Each contact sensor contacts the wearer's skin when wearable electronic device 10 is worn and may also include plated contacts. The contact sensors may include independent or cooperating sensor elements, to provide a plurality of sensory functions. For example, the contact sensors may provide an electrical resistance and/or capacitance sensory function responsive to the electrical resistance and/or capacitance of the wearer's skin. To this end, the two contact sensors may be configured as a galvanic skin-response sensor, for example. In the illustrated configuration, the separation between the two contact sensors provides a relatively long electrical path length, for more accurate measurement of skin resistance. In some examples, a contact sensor may also provide measurement of the wearer's skin temperature. In the illustrated configuration, a skin temperature sensor 54 in the form a thermistor is integrated into charging contact sensor 50, which provides direct thermal conductive path to the skin. Output from ambient-temperature sensor 48 and skin temperature sensor 54 may be applied differentially to estimate of the heat flux from the wearer's body. This metric can be used to improve the accuracy of pedometer-based calorie counting, for example. In addition to the contact-based skin sensors described above, various types of non-contact skin sensors may also be included.

Arranged inside pillow contact sensor 52 in the illustrated configuration is an optical pulse-rate sensor 56. The optical pulse-rate sensor may include a narrow-band (e.g., green) LED emitter and matched photodiode to detect pulsating blood flow through the capillaries of the skin, and thereby provide a measurement of the wearer's pulse rate. In some implementations, the optical pulse-rate sensor may also be configured to sense the wearer's blood pressure. In the illustrated configuration, optical pulse-rate sensor 56 and display 16 are arranged on opposite sides of the device as worn. The pulse-rate sensor alternatively could be positioned directly behind the display for ease of engineering.

Wearable electronic device 10 may also include motion sensing componentry, such as an accelerometer 58, gyroscope 60, and magnetometer 62. The accelerometer and gyroscope may furnish inertial data along three orthogonal axes as well as rotational data about the three axes, for a combined six degrees of freedom. This sensory data can be used to provide a pedometer/calorie-counting function, for example. Data from the accelerometer and gyroscope may be combined with geomagnetic data from the magnetometer to further define the inertial and rotational data in terms of geographic orientation.

Wearable electronic device 10 may also include a global positioning system (GPS) receiver 64 for determining the wearer's geographic location and/or velocity. In some configurations, the antenna of the GPS receiver may be relatively flexible and extend into flexible segment 30A. In the configuration of FIGS. 1A and 1B, the GPS receiver is far removed from optical pulse-rate sensor 56 to reduce interference from the optical pulse-rate sensor.

Figure 2A:
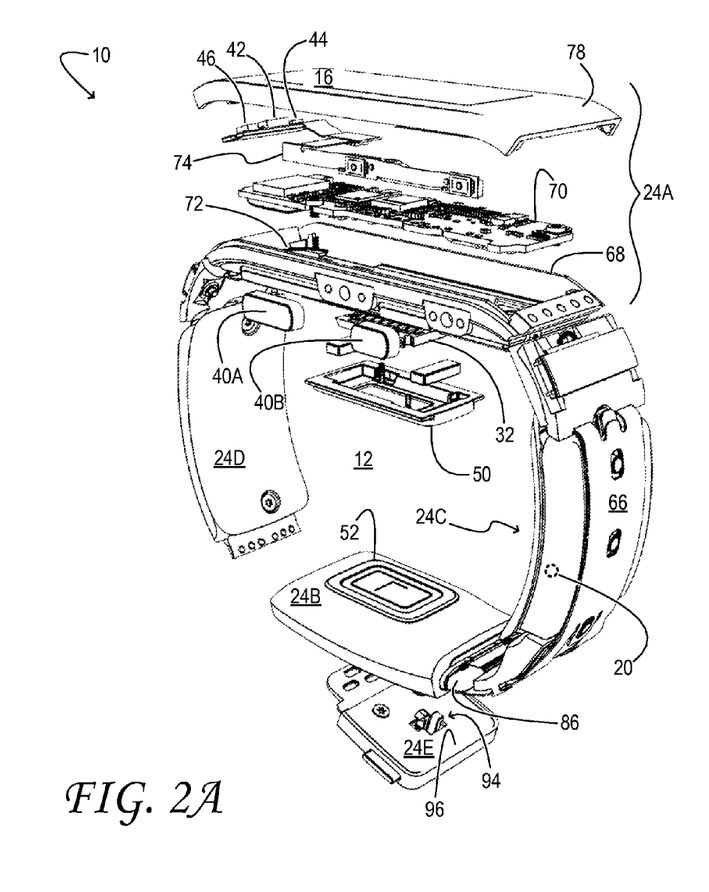
FIGS. 2A and 2B are exploded views of the example wearable electronic device.
Figure 2B:
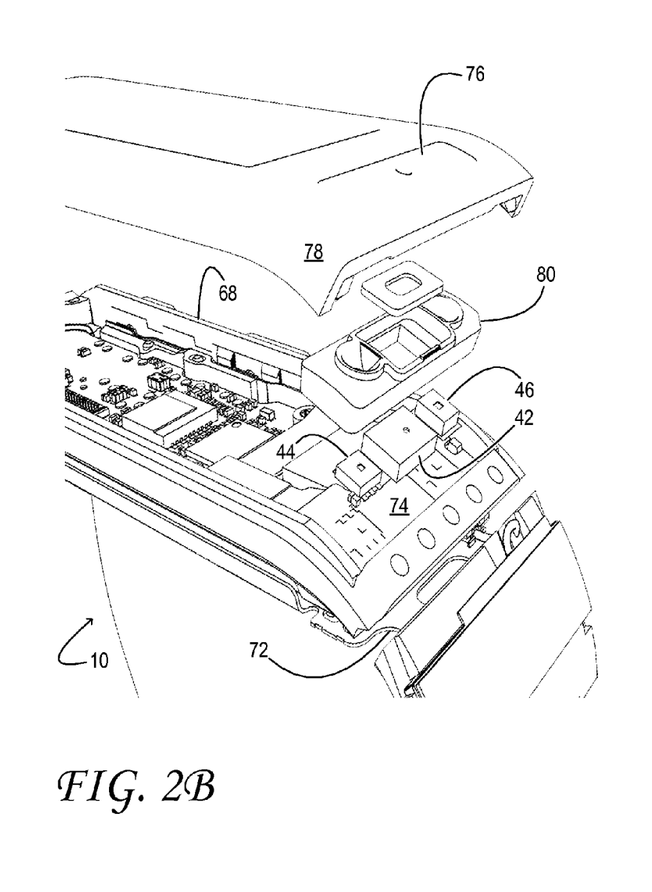

FIGS. 2A and 2B show aspects of the internal structure of wearable electronic device 10 in one, non-limiting configuration. In particular, FIG. 2A shows semi-flexible armature 66 and display carrier 68. The semi-flexible armature is the backbone of composite band 12, which supports display-carrier module 24A, pillow 24B, and energy-storage compartments 24B and 24C. The semi-flexible armature may be a very thin band of steel, in one implementation. The display carrier may be a metal frame overmolded with plastic. It may be attached to the semi-flexible armature with mechanical fasteners. In one implementation, these fasteners are molded-in rivet features, but screws or other fasteners may be used instead. The display carrier provides suitable stiffness in display-carrier module 24A to protect display 16 from bending or twisting moments that could dislodge or break it. In the illustrated configuration, the display carrier also surrounds the main printed circuit assembly (PCA) 70, where compute system 14 is located, and provides mounting features for the main PCA.

In some implementations, wearable electronic device 10 includes a main flexible FPCA 72, which runs from pillow 24B all the way to energy-storage compartment 24D. In the illustrated configuration, the main FPCA is located beneath semi-flexible armature 66 and assembled onto integral features of the display carrier. In the configuration of FIG. 2A, push buttons 40A and 40B penetrate one side of display carrier 68. These push buttons are assembled directly into the display carrier and are sealed by o-rings. The push buttons act against microswitches mounted to sensor FPCA 74.

Display-carrier module 24A also encloses sensor FPCA 74. At one end of rigid segment 24A, and located on the sensor FPCA, are visible-light sensor 44, ultraviolet sensor 46, and microphone 42. A polymethylmethacrylate window 76 is insert molded into a glass insert-molded (GIM) bezel 78 of display-carrier module 24A, over these three sensors. The window has a hole for the microphone and is printed with IR transparent ink on the inside covering except over the ultraviolet sensor. A water repellent gasket 80 is positioned over the microphone, and a thermoplastic elastomer (TPE) boot surrounds all three components. The purpose of the boot is to acoustically seal the microphone and make the area more cosmetically appealing when viewed from the outside.

As noted above, display carrier 68 may be overmolded with plastic. This overmolding does several things. First, the overmolding provides a surface that the device TPE overmolding will bond to chemically. Second, it creates a shutoff surface, so that when the device is overmolded with TPE, the TPE will not ingress into the display carrier compartment. Finally, the PC overmolding creates a glue land for attaching the upper portion of display-carrier module 24A.

The plated charging contacts of USB port 32 are overmolded into a plastic substrate and reflow soldered to main FPCA 72. The main FPCA may be attached to the inside surface of semi-flexible armature 66. In the illustrated configuration, charging contact sensor 50 is frame-shaped and surrounds the charging contacts. It is attached to the semi-flexible armature directly under display carrier 68—e.g., with rivet features. Skin temperature sensor 54 (not shown in FIG. 2A or 2B) is attached to the main FPCA under the charging contact-sensor frame, and thermal conduction is maintained from the frame to the sensor with thermally conductive putty.

Figure 3:
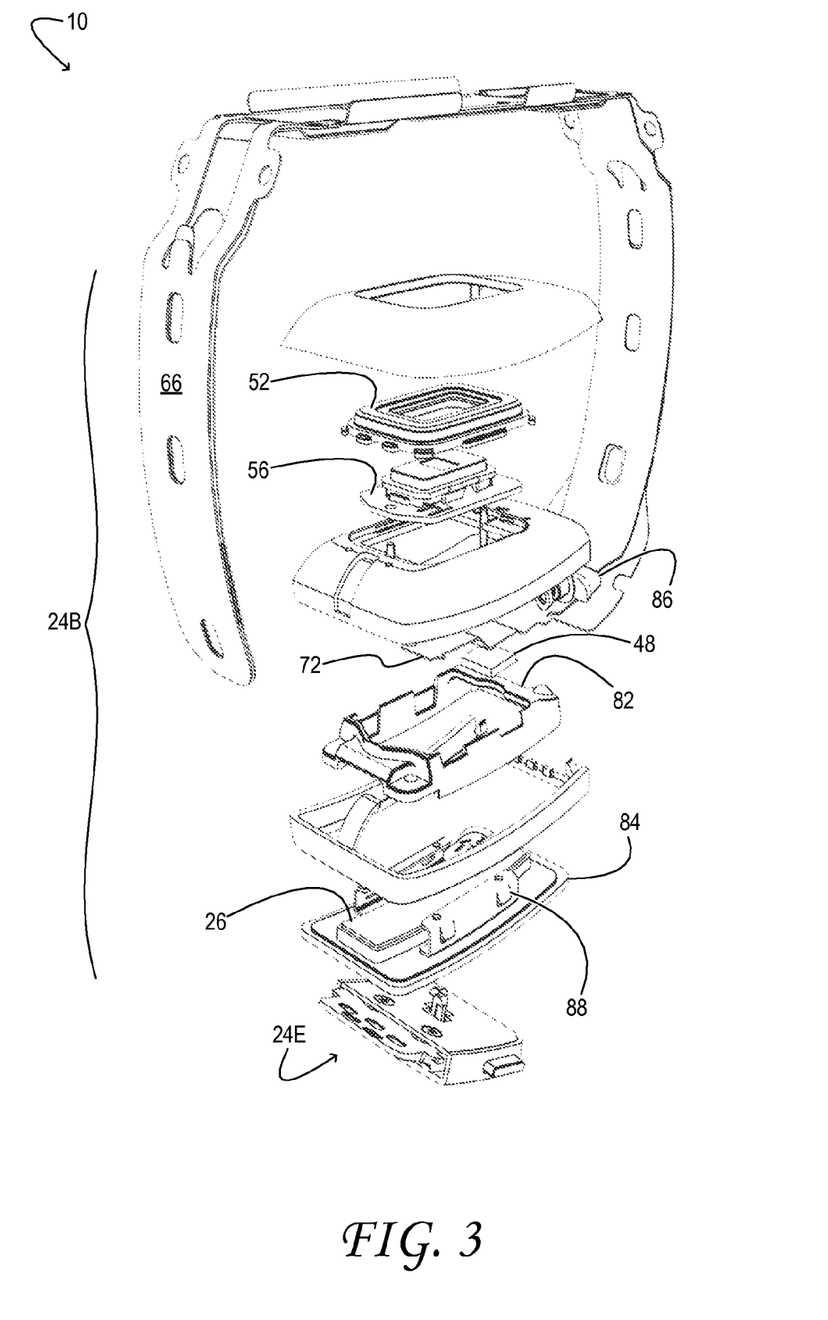
FIG. 3 is an exploded view of a portion of the example wearable electronic device.

Turning now to FIG. 3, pillow 24B includes pillow contact sensor 52, which surrounds optical pulse-rate sensor 56. The pillow also includes TPE and plastic overmoldings, an internal structural pillow case 82, and a sheet-metal or MIMS inner band 84. The pillow assembly is attached to bulkhead 86 with adhesives for sealing out water and by two screws that clamp the pillow case and the plastic overmolding securely to the bulkhead. The inner band includes receiving slot 26 and its concealed rack feature. In the illustrated configuration, the inner band is attached to the pillow via adhesives for water sealing and spring steel snaps 88, which are welded to the inside of the inner band on either side of the concealed rack. Main FPCA 72 extends through the bulkhead and into the pillow assembly, to pillow contact sensor 52. Ambient-temperature sensor 48 is attached to this FPCA and surrounded by a small plastic frame. The frame contains thermal putty to help maintain a conduction path through the inner band to the sensor. On the opposite side of the FPCA from the sensor a foam spring may be used to push the sensor, its frame, and thermal putty against the inside surface of the inner band.

Figure 4:
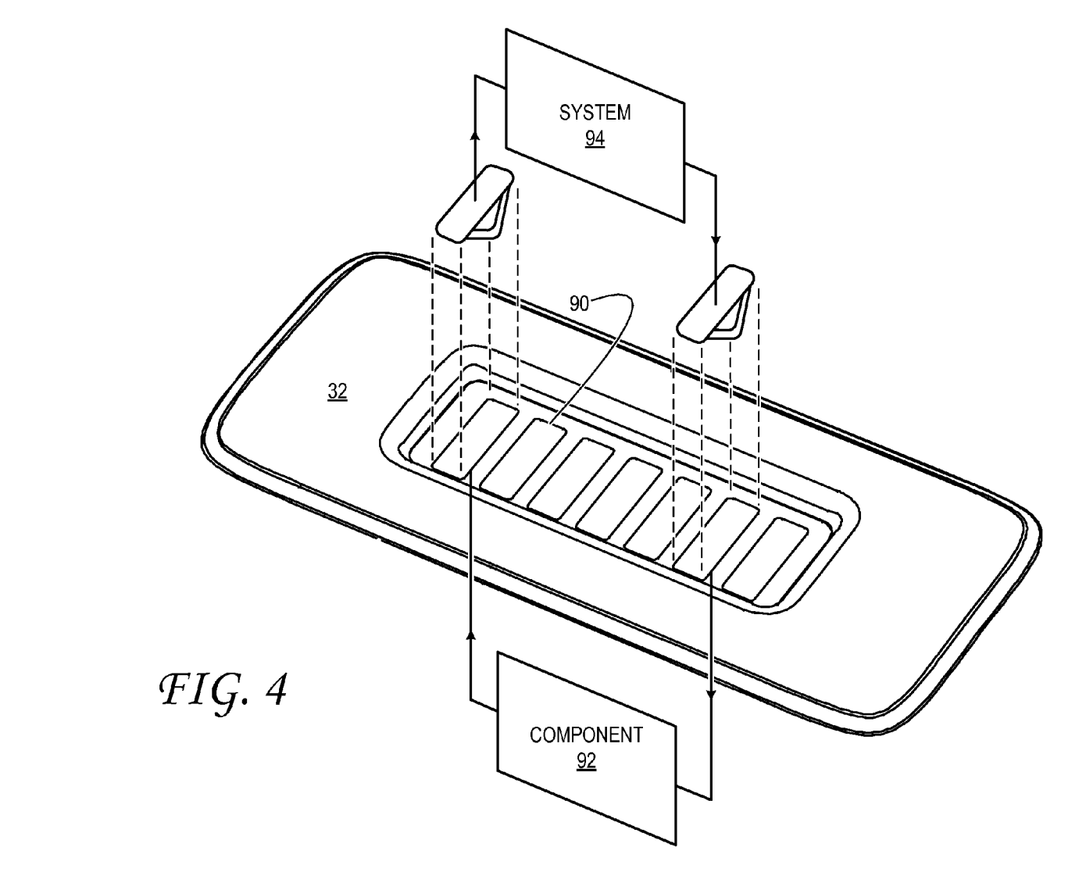
FIG. 4 shows aspects of an example charging/data port of a wearable electronic device.

FIG. 4 shows additional aspects of USB port 32 in one implementation. The USB port includes a plurality of plated contacts 90. Each of the plated contacts is electrically coupled to one or more electronic components 92 of wearable electronic device 10 and configured to carry electric current (positive, negative, or both) to the one or more electronic components. The electronic components 92 that receive the electric current may include any or all of the components described above, among others, without departing from the scope of this disclosure. For example, the electronic components may include functional components such as a display, sensor, compute system, etc. The electronic components may also include energy-storage electronic components such as a battery or supercapacitor. Furthermore, plated contacts may deliver electric current to other types of electronic components in electronic devices having different forms and functionalities.

Figure 5:
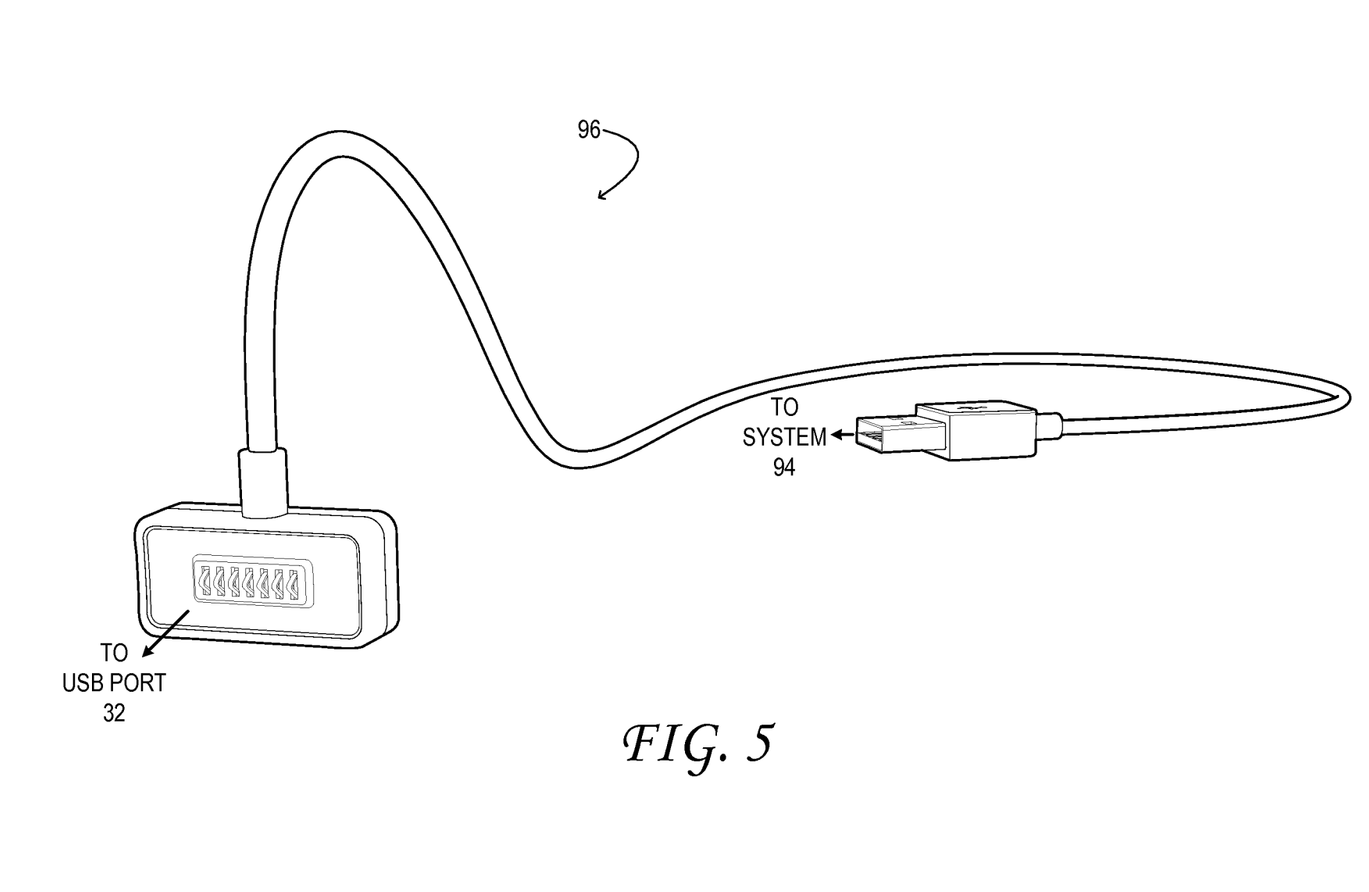
FIG. 5 shows aspects of an example connector to be coupled to the charging/data port of a wearable electronic device.

The electric current carried by each of the plated contacts 90 may be exchanged with virtually any system 94 external to wearable electronic device 10. Example external systems include a personal computer, a game console, an external battery, or a DC power supply driven by residential AC line voltage. FIG. 5 shows an example, non-limiting USB connector 96, which is fittably received into USB port 32 for the purpose of exchanging electric current—power and signal—between the external system and one or more electronic components 92 of wearable electronic device 10.

External system 94 need not always be a source of electric current per se. In some scenarios, the external system may be driven by the wearable electronic device, which sends electric current into and through the external system and back to the one or more electronic components 92 of the wearable electronic device. Examples of such a system include USB headphones, or a memory stick.

Returning now to FIG. 4, the electric current carried by each of the plated contacts 90 may be of any magnitude practicable. In some scenarios, the electric current may be on the order of hundreds or thousands of milliamperes (mA), sufficient to charge the energy-storage electronic components 28 of the wearable electronic device 10. In other scenarios, the electric current may be on the order of microamperes (μA), nanoamperes (nA) or less. Thus, the electric current may be sufficient in magnitude to exchange a digital or analog signal between wearable electronic device 10 and external system 94.

Irrespective of the magnitude of the electric current exchanged through plated contacts 90, it is generally desirable for the plated contacts to be resistant both to chemical exposure (i.e., corrosion, oxidation, dissolution) and to mechanical abrasion. Accordingly, the base metal of the electrical contact (typically a copper alloy) may be plated with one or more overlayers to improve resistance to mechanical abrasion and chemical exposure.

Mechanical abrasion of plated electrical contacts 90 may be caused by repeated insertion and withdrawal of connector 96, contact with the wearer's skin, and encounters with foreign objects. Chemical exposure, for any device worn on the skin, may include exposure to significant amounts of moisture and electrolytes from the wearer's perspiration, in addition to chemical agents found in skin-care products—e.g., moisturizers, sunblock, fragrance, and medicinal ointments. The fact that device 10 is worn on the skin (above ambient temperature) generally increases the rate of corrosion of any plated electrical contact by such agents.

Additional forms of chemical exposure are likely to occur with devices marketed for sport and recreational activities—e.g., exposure to sea water and/or chlorinated pool water. Thus, the degree of chemical exposure for a wearable electronic device as described herein may go well beyond what is expected for a typical USB host, such as a tablet or smart phone.

No aspect of the foregoing drawings or description should be interpreted in a limiting sense, because numerous other implementation environments lie within the spirit and scope of this disclosure. For instance, while USB port 32 of wearable electronic device 10 is one area of application for plated electrical contacts, such contacts may be usable elsewhere on the wearable electronic device, and on entirely different electronic devices. Plated electrical contacts may be used for audio and video couplings (e.g., micro-HDMI), for system bus extensions, and for other types of charging contacts, for example.

Corrosion of an electrical contact overplated with gold is typically nucleated at one or more defects in the gold, such as cracks, pin holes, and/or handling-induced perforations or material removal. Such defects expose the less oxidation-resistant layer (e.g., nickel plating) to oxygen from the air, chlorine from pool water or sweat, and to acidic, oxidizing, and/or complexing species from other chemical agents. Corrosion in the less oxidation-resistant layer may then proceed laterally, in extreme cases causing the softer gold overlayer to flake, exposing more of the less oxidation-resistant layer, and causing accelerated oxidation or chemical dissolution.

Also to be expected with sport devices are certain use (or misuse) scenarios in which a user may insert a powered charging connector 96 into wearable device 10 when plated electrical contacts 90 are still wet with an electrolyte, such as perspiration or sea water. Because the various contacts are electrically biased with respect to each other, such action could cause metal (including the gold overlayer) to electrolytically deplate from the contacts or electrochemically decompose, resulting in additional defects, structural damage or weakened resistance to subsequent chemical or mechanical stress.

Moreover, the very fact that device 10 is worn on the skin means that corrosion of a plated electrical contact 90 may have adverse consequences for the wearer, as well as the device. For instance, nickelous ($Ni^{2+}$) ions released onto the skin due to the corrosive oxidation of nickel plating may cause dermatitis in some individuals. Other metals used in contact plating may also cause skin irritation.

Figure 6A:
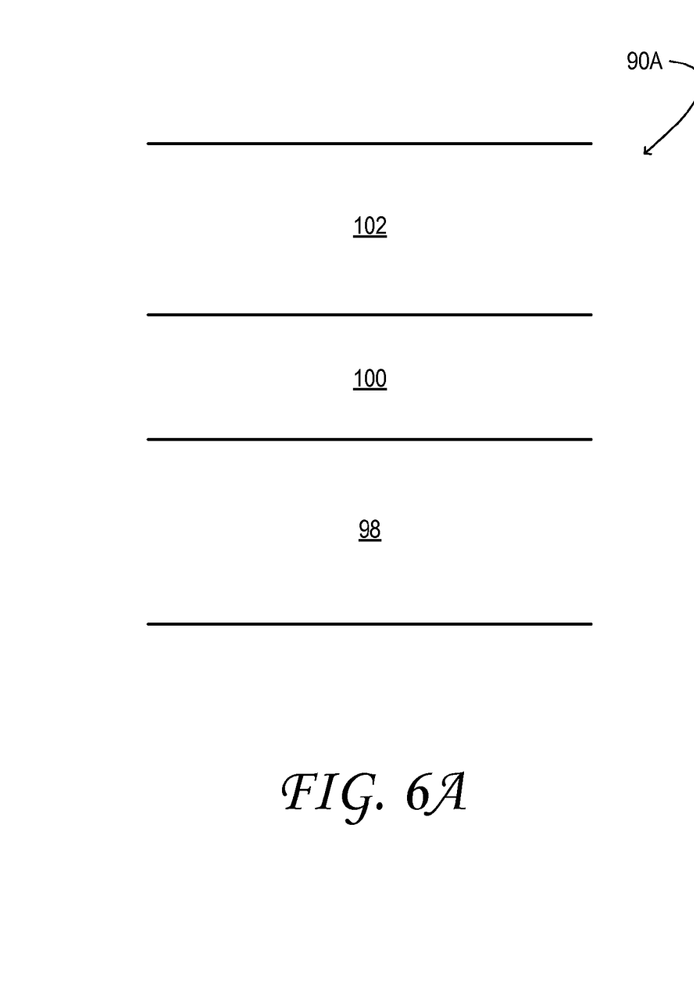
FIGS. 6A and 6B show aspects of example layer structures of plated electrical contacts.

To address the above issues, plated electrical contact 90 in wearable electronic device 10 or any other electronic device may have the example layered structure shown in FIG. 6A. Plated contact 90A of FIG. 6A includes a base copper-alloy layer 98. A PGM layer 100 is plated over the copper-alloy layer, and a gold-alloy layer 102 is plated over the PGM layer. Plated electrical contacts of this kind exhibit remarkably improved corrosion resistance relative to those having a nickel layer sandwiched between the base metal and gold-alloy overlayer. Without being tied to any particular theory, it is believed that the improved oxidation resistance of PGM metals over nickel makes the overall structures more chemically resistant, such that even a significant density of defects in gold-alloy layer 102 is tolerable (i.e., will not nucleate lateral oxidation in the PGM). It may also be the case that gold-alloy layer 102 adheres better to certain PGM layers 100 than to nickel or other layers, resulting in fewer defects in the overlayer.

Continuing in FIG. 6A, copper-alloy layer 98 may be a zinc-free bronze, for example. Alternatively, or in addition, the copper-alloy layer may include an aluminum bronze, silicon bronze, and/or phosphor bronze. PGM layer 100 may include any platinum-group metal: ruthenium, rhodium, palladium, osmium, iridium, and/or platinum. The PGM layer may be a PGM-alloy layer, in some examples. Suitable PGM alloys may include only PGM metal, or may include non-PGM metals as well. A PGM alloy may even include nickel, in cases where the alloying with a PGM imparts oxidation resistance and/or other desirable properties. In some examples, the PGM layer may include palladium, whether in elemental form or as an alloy. In one example, the PGM layer may be an alloy with a high palladium to nickel ratio—80Pd/20Ni, for instance.

The term 'layer' is applied herein both to homogeneous and heterogeneous strata of a plated electrical contact. In some examples a given layer may be substantially homogeneous over its entire thickness. In other examples, a given layer may be at least somewhat heterogeneous: its composition may vary as a function of distance from the base layer. Thus, a given alloy layer (e.g., PGM layer 100 in some implementations) may have any desired composition gradient—continuous or stepwise. One advantage of using a PGM alloy layer with a composition gradient is to provide desirable overall hardness, together with desirable stress relief at the interface with the base layer. Stress relief at the interface prevents blistering and promotes adhesion to the base layer. In one example, PGM layer 100 may include a few microinches of substantially pure palladium at the interface with the copper-allow layer 98, which transitions to 80Pd/20Ni. The pure palladium at the interface is softer and provides excellent stress relief, while the 80Pd/20Ni portion provides the desired hardness.

The overall thickness of PGM layer 100 may differ for different types of plated electrical contacts. In one example, the PGM layer may be at least 30 microinches in thickness. In another example, the PGM layer may be greater than 90 microinches in thickness, or between 90 and 250 microinches.

For some types of plated electrical contact, gold-alloy layer 102 may be a so-called 'hard gold' layer, provided for increased wear resistance. In some implementations, a hard gold layer may include cobalt. Alternatively, iron or another metal may be used as an alloying agent. In one example, the gold-alloy layer may be at least 30 microinches in thickness. In another example, the gold-alloy layer may be at least 100 microinches in thickness. In some examples, a gradient-type gold alloy layer may be used, with a few microinches softer (e.g., substantially pure) gold at the PGM-layer interface, transitioning thereafter to hard gold.

In the plated electrical contact of FIG. 6A, PGM layer 100 is plated directly onto copper-alloy layer 98, and gold-alloy layer 102 is plated directly onto the PGM layer. Other configuration are equally contemplated, however. In plated contact 90B of FIG. 6B, one or more additional PGM layers 104 (104A, 104B, etc.) are arranged between the first PGM layer 100 and gold-alloy layer 102. Further, each of the additional PGM layers is arranged over an underlying gold layer 106 (106A, 106B, etc.). In the illustrated example, each of the additional PGM layers is plated directly onto the underlying gold layer. The gold-alloy layer and each underlying gold layer is plated directly onto the PGM layer directly beneath it. In other examples, there may be additional intervening layers. In multilayer structures as shown in FIG. 6B, each underlying gold layer may be a substantially pure gold layer—so called 'soft gold'—for relief of micromechanical stresses that adjacent layers may exert upon each other.

Despite the high level of corrosion resistance imparted by gold and gold-alloy overlayers, these layers may be omitted in some plated electrical contacts. In other words, a PGM layer may be the terminal layer for the contact. PGM layers suitable for this purpose include relatively high amounts of very noble PGMs—platinum and rhodium, as non limiting examples.

Figure 6B:
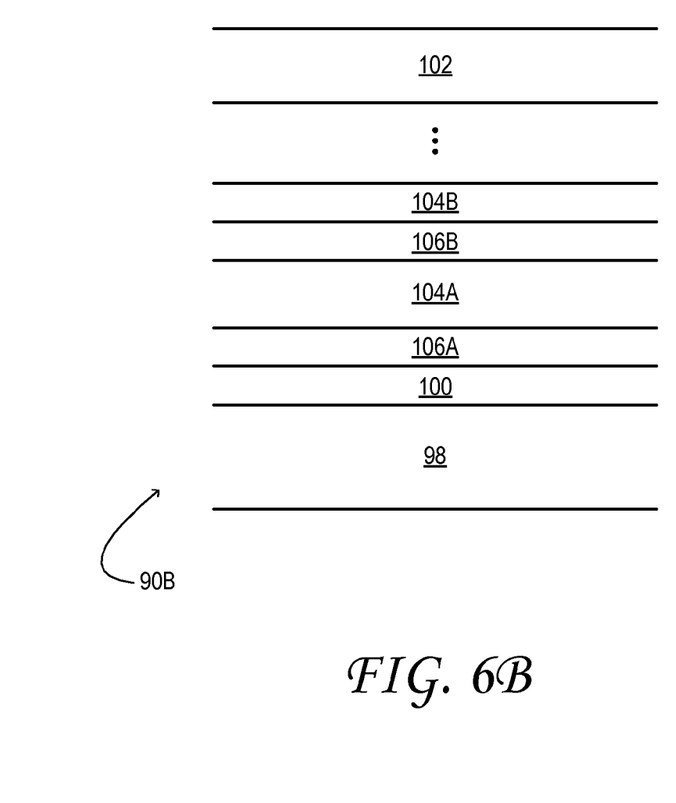
Figure 7A:
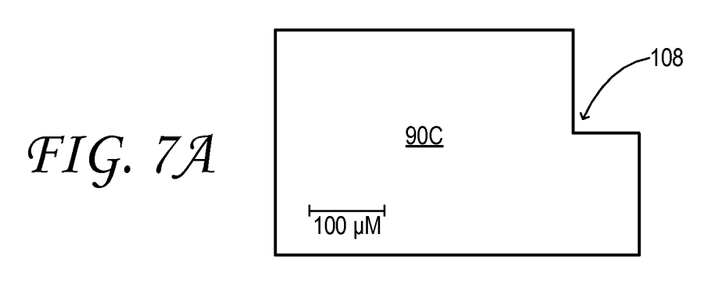
FIG. 7A shows aspects of a plated electrical contact having an abrupt step edge.
Figure 7B:
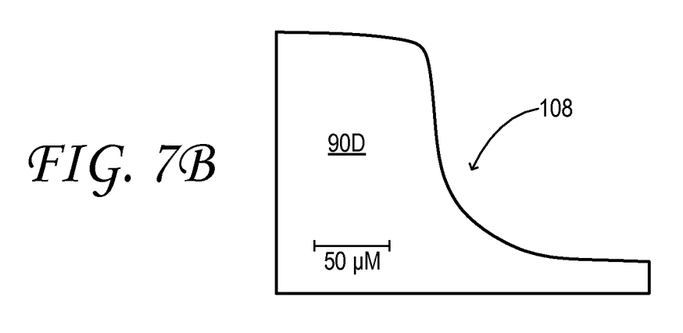
FIG. 7B shows aspects of a plated electrical contact having a rounded step edge.

Plated electrical contacts with the layered structures of FIGS. 6A and 6B may have virtually any topology, without departing from the scope of this disclosure. Plated contacts with abrupt concavities, such as step edges, as shown in FIG. 7A, may be susceptible to defects in corner region 108, due to shadowing from the line of sight of the deposition process. Such defects are markedly reduced when each corner region of the copper-alloy base layer of the electrical contact to be plated has a radius of curvature comparable to the feature size. In some examples, a radius of curvature on the order of 100 microns is sufficient to promote a uniform, low-defect coverage. This topology is shown by example in FIG. 7B.

Figure 8:
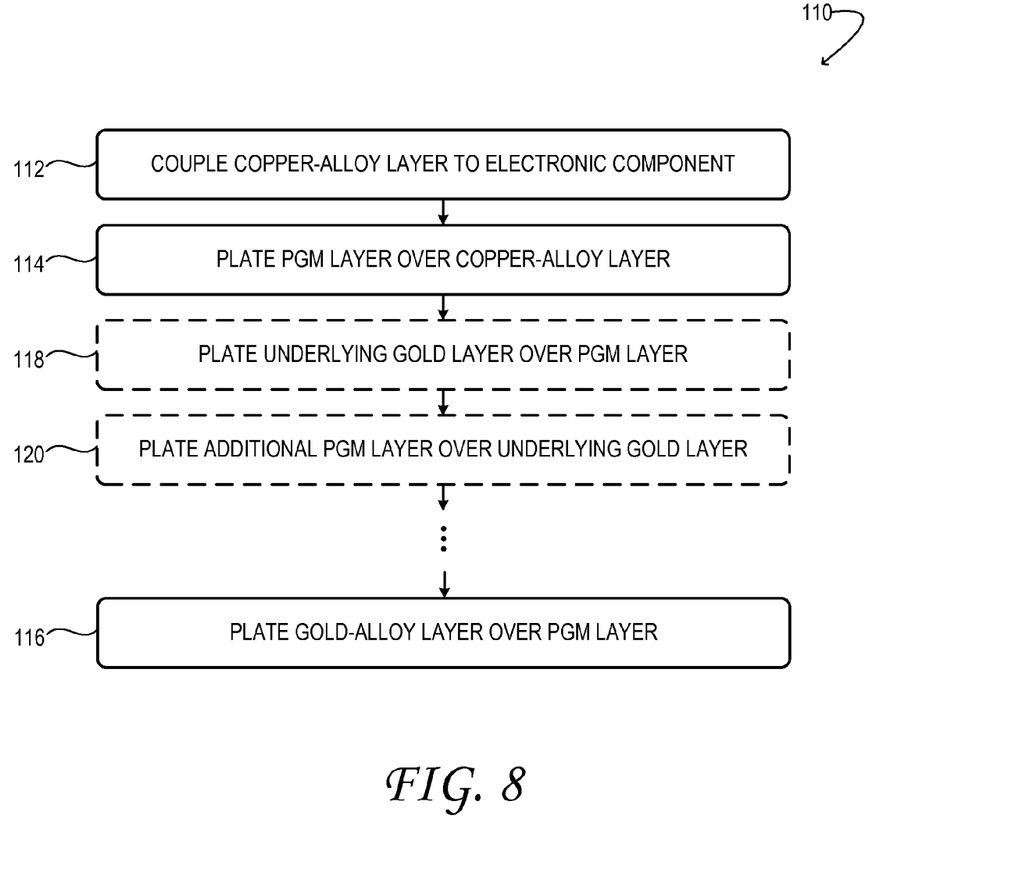
FIG. 8 illustrates an example method for making a wearable electronic device.

FIG. 8 illustrates an example method 110 for making a wearable electronic device. At 112 of method 110, a copper-alloy layer is coupled to an electronic component of the wearable device, the electronic component being configured to receive electric current. At 114, a PGM layer is plated over the copper-alloy layer. At 116, a gold-alloy layer is plated over the PGM layer to form a plated contact, the plated contact being electrically coupled to the electronic component and configured to carry the electric current to the electronic component from a system external to the device.

Method 110 also includes optional plating steps 118 and 120. At 118 an underlying gold layer is plated over the PGM layer directly beneath it. At 120, an additional PGM layer is plated over the underlying gold layer. Optional plating steps 118 and 120 may be repeated any number of times to build a more complex layered structure for the plated electrical contact.

In the foregoing method, any or all of the above plating acts may include electroplating. The electroplating may be enacted in an aqueous or nonaqueous electrolyte solution containing appropriate precursor salts of the metals to be plated—e.g., salts of complex metal ions—and anodes comprising such metals. Electroplating may be conducted under controlled-current or controlled-potential conditions, for example. Alternatively, or in addition, any or all of the above plating acts may include electroless deposition, chemical vapor deposition, and/or evaporative deposition of substantially pure metals and/or alloys, as deposition technology allows.

The configurations and approaches described herein are exemplary in nature, and that these specific implementations or examples are not to be taken in a limiting sense, because numerous variations are feasible. The specific routines or methods described herein may represent one or more processing strategies. As such, various acts shown or described may be performed in the sequence shown or described, in other sequences, in parallel, or omitted.

The subject matter of this disclosure includes all novel and non-obvious combinations and sub-combinations of the various processes, systems and configurations, and other features, functions, acts, and/or properties disclosed herein, as well as any and all equivalents thereof.

The invention claimed is:

1. An electronic device comprising:
   an electronic component wearable on human skin and configured to receive electric current; and
   a mechanically contactable plated electrical contact coupled to the electronic component and configured to carry the electric current to the electronic component from a system external to the electronic device, the plated electrical contact including:
      a copper-alloy layer;
      a platinum-group metal (PGM) layer plated over the copper-alloy layer; and
      a gold-alloy layer plated over the PGM layer.

2. The electronic device of claim 1, wherein the PGM layer is plated directly onto the copper-alloy layer.

3. The electronic device of claim 1, wherein the PGM layer includes palladium.

4. The electronic device of claim 1, wherein the PGM layer is a PGM-alloy layer.

5. The electronic device of claim 4, wherein the PGM-alloy layer includes nickel.

6. The electronic device of claim 1, wherein the gold-alloy layer is at least thirty microinches in thickness.

7. The electronic device of claim 1, wherein the copper-alloy layer is a zinc-free bronze.

8. The electronic device of claim 1, wherein the gold-alloy layer includes cobalt.

9. The electronic device of claim 1, wherein the gold-alloy layer is plated directly onto the PGM layer.

10. The electronic device of claim 1, wherein the PGM layer is a first PGM layer, the plated contact further comprising one or more additional PGM layers arranged between the first PGM layer and the gold-alloy layer.

11. The electronic device of claim 10, wherein each of the additional PGM layers is arranged over an underlying gold layer.

12. The electronic device of claim 11, wherein each of the additional PGM layers is plated directly onto the underlying gold layer.

13. The electronic device of claim 10, wherein the gold-alloy layer and each underlying gold layer is plated directly onto the PGM layer directly beneath it.

14. The electronic device of claim 10, wherein each underlying gold layer is a substantially pure gold layer.

15. A method comprising:
    coupling a copper-alloy layer to an electronic component of an electronic device, the electronic component wearable on human skin and configured to receive electric current;
    plating a platinum-group metal (PGM) layer over the copper-alloy layer to form a mechanically contactable plated electrical contact, the plated contact being coupled to the electronic component and configured to carry the electric current to the electronic component from a system external to the electronic device; and
    plating a gold-alloy layer over the PGM layer.

16. The method of claim 15, wherein said plating includes electroplating.

17. The method of claim 15, wherein said plating includes electroless deposition, chemical vapor deposition, and/or evaporative deposition.

18. An electronic device to be worn on human skin, the electronic device comprising:
    an electronic component wearable on human skin and configured to receive electric current; and
    a mechanically contactable plated electrical contact coupled to the electronic component and configured to carry the electric current to the electronic component from a system external to the electronic device, the plated electrical contact including:
       a copper-alloy layer;
       a platinum-group metal (PGM) layer plated directly onto the copper-alloy layer; and
       a gold-alloy layer plated directly onto the PGM layer.

19. The electronic device of claim 18, wherein the copper-alloy layer includes an aluminum bronze, silicon bronze, and/or phosphor bronze, and wherein the gold-alloy layer is at least thirty microinches in thickness.

* * * * *